United States Patent
Iozia

(10) Patent No.: US 12,287,631 B2
(45) Date of Patent: Apr. 29, 2025

(54) METHOD FOR THE MANAGEMENT OF A WAREHOUSE THAT HOUSES PNEUMATIC TIRES FITTED WITH TRANSPONDERS AND ARRANGED IN VERTICAL STACKS

(71) Applicant: Bridgestone Europe NV/SA [BE/BE], Zaventem (BE)

(72) Inventor: Francesco Iozia, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 212 days.

(21) Appl. No.: 18/022,553

(22) PCT Filed: Aug. 31, 2021

(86) PCT No.: PCT/EP2021/073971
§ 371 (c)(1),
(2) Date: Feb. 22, 2023

(87) PCT Pub. No.: WO2022/049054
PCT Pub. Date: Mar. 10, 2022

(65) Prior Publication Data
US 2024/0012416 A1   Jan. 11, 2024

(30) Foreign Application Priority Data
Sep. 1, 2020 (IT) .................. 102020000020770

(51) Int. Cl.
*G06K 7/01* (2006.01)
*B25J 9/00* (2006.01)
(Continued)

(52) U.S. Cl.
CPC ......... *G05D 1/0094* (2013.01); *G05D 1/0088* (2013.01)

(58) Field of Classification Search
None
See application file for complete search history.

(56) References Cited

U.S. PATENT DOCUMENTS

| | | | |
|---|---|---|---|
| 2009/0021351 A1 | 1/2009 | Beniyama et al. | |
| 2014/0049375 A1* | 2/2014 | Fenkanyn | G06K 19/07764 340/10.1 |

(Continued)

FOREIGN PATENT DOCUMENTS

| | | |
|---|---|---|
| CN | 204287974 U | 4/2015 |
| DE | 102010011867 A1 | 9/2011 |

(Continued)

OTHER PUBLICATIONS

International Search Report for corresponding patent application No. PCT/EP/2021/073971, dated Nov. 12, 2021, 4 pages.

*Primary Examiner* — Adam D Tissot
*Assistant Examiner* — Michael T Silva
(74) *Attorney, Agent, or Firm* — Patterson Intellectual Property Law, PC

(57) ABSTRACT

Autonomously guided robot (8) for the automatic recognition of pneumatic tyres (2) fitted with transponders (7) and arranged in a stack. The autonomously guided robot (8) has: a main body (21) that is capable of moving independently within a storage warehouse (1) wherein the stack of pneumatic tyres (7) is arranged; a reader device (9) which is provided with a reader component (10) and an antenna (11) and that is capable of reading the transponders (7); a movement unit (14) which is mounted on the main body (21) and that supports the antenna (11) for moving the antenna (11) in relation the main body (21) in a vertical direction (Z); and a control unit (24).

16 Claims, 6 Drawing Sheets

(51) Int. Cl.
*B65G 1/04* (2006.01)
*G05D 1/00* (2006.01)
*G05D 1/02* (2020.01)
*G06Q 10/08* (2024.01)

(56) References Cited

U.S. PATENT DOCUMENTS

2016/0236867 A1\* 8/2016 Brazeau .................. B25J 5/007
2021/0221612 A1\* 7/2021 Rogers ................ B65G 1/1371
2021/0403297 A1\* 12/2021 Lozia ............... G06K 19/07773

FOREIGN PATENT DOCUMENTS

WO  2019219659 A1  11/2019
WO  2020064630 A1  4/2020

\* cited by examiner

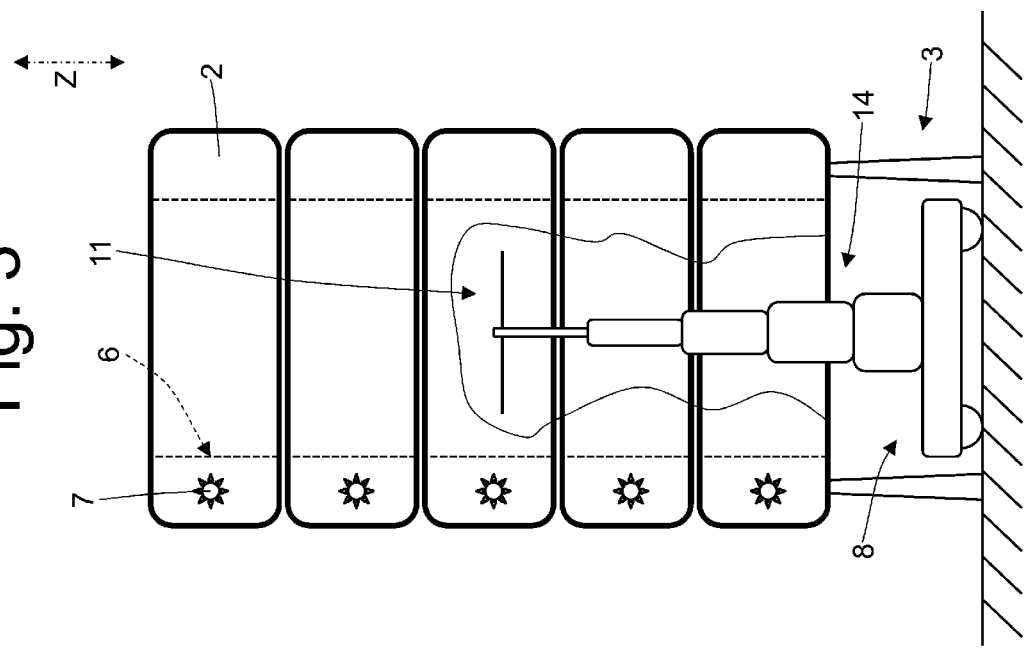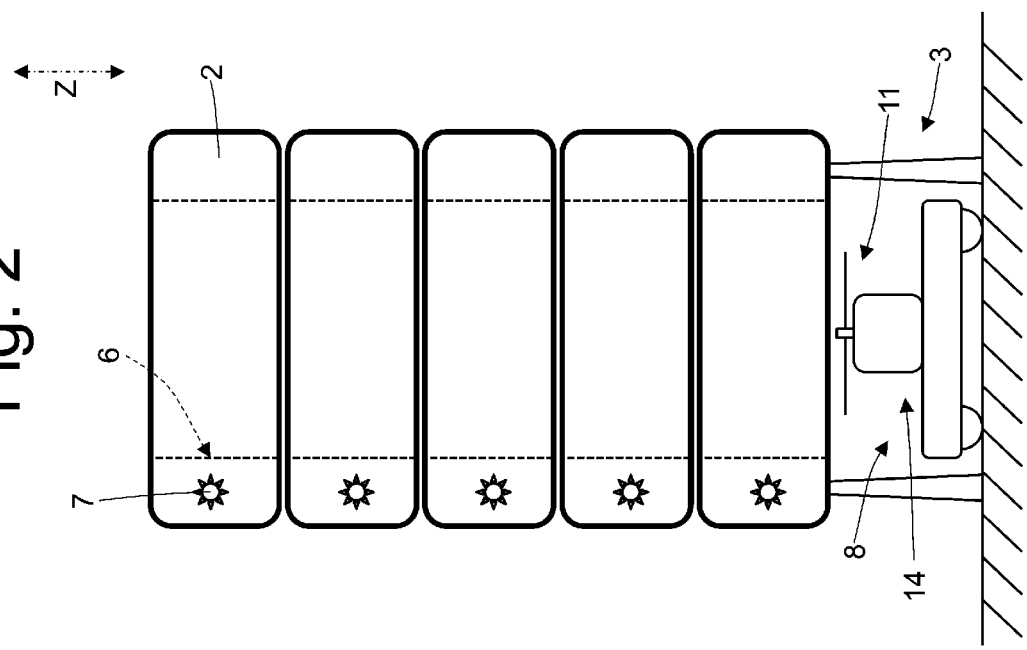

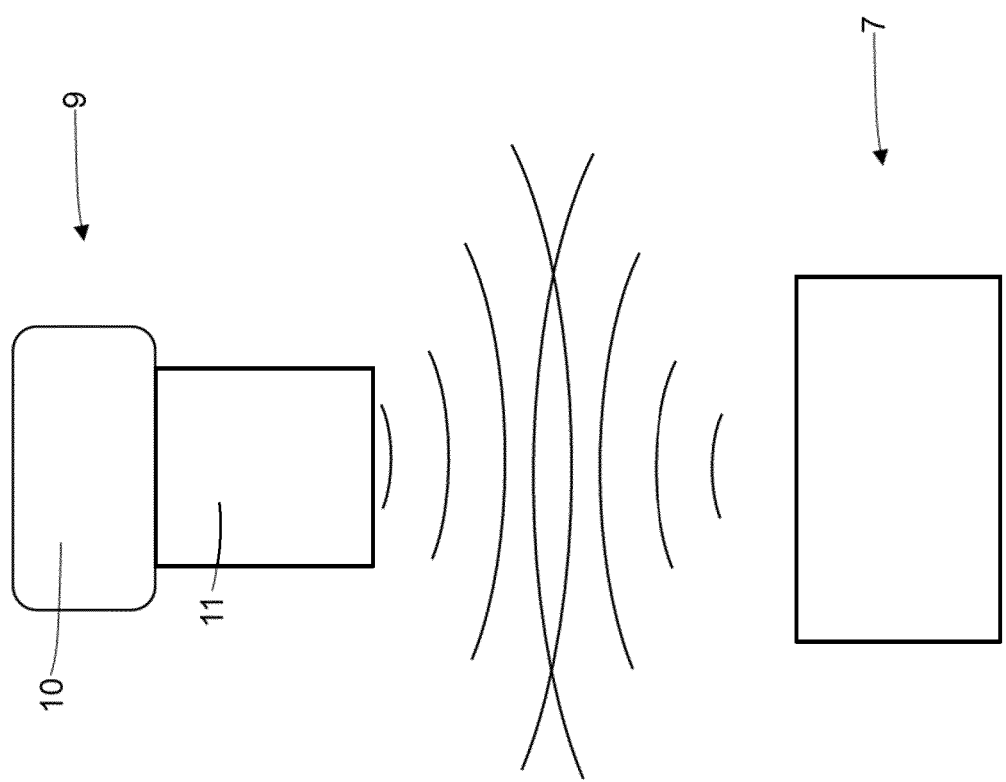

ns fitted
METHOD FOR THE MANAGEMENT OF A WAREHOUSE THAT HOUSES PNEUMATIC TIRES FITTED WITH TRANSPONDERS AND ARRANGED IN VERTICAL STACKS

TECHNICAL SECTOR

The present invention relates to a method for the management of a warehouse that houses pneumatic tires fitted with transponders and arranged in vertical stacks.

Furthermore, the present invention relates to an autonomously guided robot that makes it possible to implement the management method.

PRIOR ART

In general, for the handling of pneumatic tires at the end of a production line (typically for the loading of the pneumatic tires into the shipping containers) or in a sorting warehouse, forklifts are used that are equipped with a pair of forks which lift (at least) one stack of pneumatic tires from the base (typically when the stack of pneumatic tires is placed upon a pallet) or else that are equipped with a pair of grippers that laterally grasp a stack of pneumatic tires.

In the last few years the emergence has been observed of so-called "smart" pneumatic tires, which are fitted with transponders (i.e., with electronic devices that are suitable for communicating using radio frequency) that make it possible to remotely communicate information such as the identification, characteristics and history of the pneumatic tire.

Consequently, an operator, in addition to handling pneumatic tires by means of a forklift, must also be able to access such information and therefore read, using an appropriate reader, the transponders associated with the pneumatic tires themselves, for example in order to verify that the operator is working on the correct pneumatic tires and/or in order to store, within an electronic register, a modification to the position of the pneumatic tires.

Normally the operator that maneuvers the forklift is equipped with a manual reader (i.e., a reader of limited weight that makes it easy to transport): once the pneumatic tires have been loaded onto the forklift the operator descends from the forklift and, approaching the pneumatic tires with the reader, reads the corresponding transponders in order to identify with certainty the pneumatic tires themselves. This operational procedure involves however a significant and inefficient loss of time, insofar as the operator must descend from the forklift (therefore having to turn off the forklift and arrange it in a parking configuration), and must also take the manual reader up to each pneumatic tire in order to read the corresponding transponder (i.e., known manual readers are not capable of simultaneously reading the transponders of all of the pneumatic tires of a stack of pneumatic tires, but rather it is necessary to take the reader up to each individual pneumatic tire of the stack).

In this regard it is important to observe that the maximum reading distance of a transponder embedded within a single pneumatic tire is around 1-2 meters and that a stack of pneumatic tires has a height that is normally greater than 3 meters (greater therefore than the maximum reading distance); furthermore, when numerous pneumatic tires are close together (stacked), shielding and/or reflections can be created due to metallic parts of the pneumatic tires themselves, thereby further reducing the maximum reading distance of the transponders embedded within the pneumatic tires.

In order to increase the maximum pneumatic tire transponder reading distance, it has been proposed to apply, on the outer surface of the pneumatic tire (i.e., on the tread of the pneumatic tires), one or two additional and temporary transponders (insofar as they are clearly intended to be removed during first assembly) which, in not being shielded by the pneumatic tires (they are arranged externally), can be read at a much greater distance compared to a transponder embedded within the structure of the pneumatic tire. However, this solution involves a considerable increase in costs (both as regards the requirement of having to purchase additional transponders, and the requirement to program and apply the additional transponders), and also an increase in waste generated by the process (the additional transponders will be discarded during first assembly).

In patent application EP2733639A1, the implementation is described of a reader that is fitted with an elongated antenna which can be inserted into a stack of pneumatic tires in order to read simultaneously, i.e. with a single maneuver such as to introduce the antenna into the space available within the stack of pneumatic tires, the transponders of all of the pneumatic tires of the stack.

Such a reader, fitted with an elongated antenna, can be used manually by an operator (in this case the stack of pneumatic tires remains stationary and the reader is moved), or else it can be arranged in a fixed position (on the floor from below or within a portal from above) and a forklift is driven in such a way as to insert the stack of pneumatic tires into the antenna (in this case the stack of pneumatic tires moves and the reader remains stationary). That proposed within patent application EP2733639A1 also however involves a loss of time insofar as, in any case, it requires the operator to descend from the forklift in order to insert the antenna into the stack of pneumatic tires, or else it requires the operator to perform rather complex maneuvers in order to insert the stack of pneumatic tires into the antenna (with the risk of damaging the antenna if by chance the pneumatic tires impact the antenna due to an error in maneuvering).

The patent application WO2020064630A1 describes a forklift comprising a transponder reader device fitted with an antenna and a movement unit, which supports the antenna and that is capable of moving the antenna between a waiting position, wherein the antenna is arranged at a certain distance from the stack of pneumatic tires carried by the forklift gripping device, and a working position, wherein the antenna is arranged inside the stack of pneumatic tires carried by the forklift gripping device. The solution proposed in the patent application IT102018000008933 makes it possible to significantly reduce, but not completely annul, the losses of time for the operator; furthermore, this solution requires the installation on board the forklift of a control and movement unit which is relatively bulky and complex in having to move the antenna of the reading device in order to allow the antenna to complete some rather large movements.

The patent application US2008077511A1 describes a small robotic vehicle that is manually guided through the shelves of a store or a warehouse in order to generate an inventory of the items on the shelving, identifying the items, recognizing a position for each item, and reading a barcode for each item.

The patent application US2009021351A1 describes a small robotic vehicle that in passing through the shelves of a store or a warehouse generates an inventory of the items on the shelf, reading in radio frequency (or contactlessly) "smart labels" that are attached to the items.

DESCRIPTION OF THE INVENTION

The aim of the present invention is to provide a method for the management of a warehouse that houses pneumatic tires fitted with transponders and arranged in vertical stacks, which method is both free from the disadvantages described above and, at the same time, is easy and inexpensive to implement.

According to the present invention, a method is provided for the management of a warehouse that houses pneumatic tires fitted with transponders and arranged in vertical stacks according to that set out in the attached claims.

The claims describe preferred embodiments of the present invention forming an integral part of the present description.

BRIEF DESCRIPTION OF THE DRAWINGS

The present invention will now be described with reference to the attached drawings, which illustrate an exemplary, non-limiting embodiment, wherein:

FIGS. 2 and 3 are two schematic views of a stack of pneumatic tires fitted with transponders that is arranged within the storage warehouse of FIG. 1 and that is coupled to an autonomously guided robot for the automatic recognition of pneumatic tires;

FIG. 4 is a schematic view of a pneumatic tire transponder and of a reading device of the autonomously guided robot of FIGS. 2 and 3;

PREFERRED EMBODIMENTS OF THE INVENTION

Figure 1:
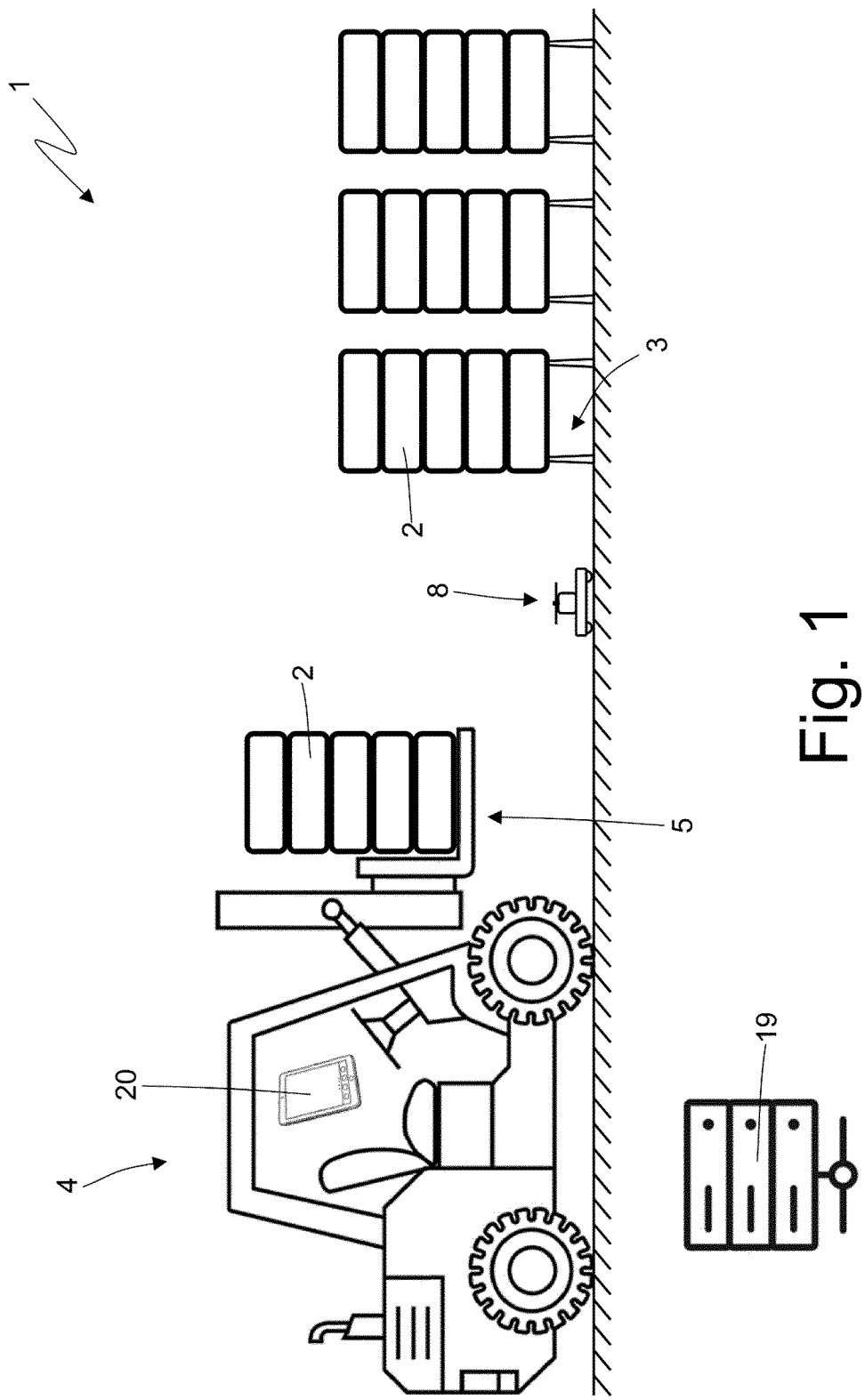
FIG. 1 is a schematic view of a storage warehouse for pneumatic tires that have to be loaded into containers or trucks in order to be shipped to customers.

In FIG. 1, indicated in the entirety thereof with the number 1 is a storage warehouse for pneumatic tires 2 that are to be loaded into containers or trucks in order to be shipped to customers.

A plurality of support elements 3 is arranged within the storage warehouse 1, wherein each thereof is suitable for supporting a stack of pneumatic tires 2 oriented vertically at a certain distance from the ground (i.e., from the floor of the storage warehouse 1); i.e., each support element 3 maintains the base of a stack of pneumatic tires 2 raised above the ground below, in such a way that there is a gap between the base of a stack of pneumatic tires 2 and the ground. In other words, the support elements 3 are shelves or racks that support the stacks of pneumatic tires 2, keeping them raised above the ground (i.e., above the floor of the storage warehouse 1).

A series of forklifts 4 operate within the storage warehouse 1 which forklifts move the stacks of pneumatic tires 2 and in particular place the stacks of pneumatic tires 2 originating from the production lines onto the support elements 3 and pick up the stacks of pneumatic tires 2 from the support elements 3 in order to place the stacks of pneumatic tires 2 within a container or truck.

Each forklift 4 is a utility vehicle equipped with wheels, is driven by an electric, diesel or gas motor, and comprises a gripping device 5 which is arranged at the front and which is suitable for picking-up a stack of pneumatic tires 2. In the embodiment illustrated in the accompanying figures, the gripping device 5 comprises a pair of forks (only one of which is visible in the attached figures), which raise the stack of pneumatic tires 2 from the base; according to a different embodiment, not illustrated, the gripping device 5 comprises a pair of grippers that grasp the stack of pneumatic tires 2 laterally.

As illustrated in FIGS. 2 and 3, each pneumatic tire 2 has an annular shape having a central cavity 6. Furthermore, each pneumatic tire 2 is fitted with its own transponder 7, i.e., with an electronic device (normally passive, i.e., without its own a power supply) that is capable of storing information and that is able to communicate by means of radio frequency. In other words, each transponder 7 is a small-sized "smart label" that is integrated into the pneumatic tire 2 and that is capable of responding to remote queries from specific fixed or portable devices, called readers (or also querying devices); a reader is capable of reading and/or modifying the information contained within the transponder 7 that it is querying, while communicating with the transponder itself 7 using radio frequency. Accordingly, the transponder 7 is part of a wireless reading and/or writing system that operates according to so-called RFID technology ("Radio-Frequency IDentification").

The storage warehouse 1 is provided with a logistics system that makes it possible to manage, in a highly automated manner, the handling of pneumatic tires 2 by virtue of the autonomous reading (i.e., without the manual intervention of an operator) of the transponders 7 of the pneumatic tires 2.

Within the storage warehouse 1 (at least) one autonomously guided robot 8 also operates for the automatic recognition of pneumatic tires 2 by reading the corresponding transponders 7 (the autonomously guided robot 8 is an essential part of the logistics system). In other words, the autonomously guided robot 8 is capable of moving by itself (independently) within the storage warehouse 1 in order to position itself at the base of a stack of pneumatic tires 2 (as illustrated in FIGS. 2 and 3) and to then read the transponders 7 of the stack of pneumatic tires 2 arranged above the same autonomously guided robot 8.

In particular and as best illustrated in FIG. 4, the autonomously guided robot 8 comprises a reader device 9, which is capable of communicating (interacting) with the transponders 7 of the pneumatic tires 2; generally the reader device 9 limits itself to reading the contents of the memory of the transponders 7, essentially in order to identify the corresponding pneumatic tires 2 but the reader device 9 may also (partially) modify the contents of the memory of the transponders 7.

As illustrated in FIG. 4, the reader device 9 comprises a wireless reader component 10 (i.e., that makes use of electromagnetic waves) and at least one antenna 11 which emits and receives radio waves; it is possible that the reader component 10 comprises a plurality of antennas 11 (for example two, three or four antennas 11).

Figure 5:
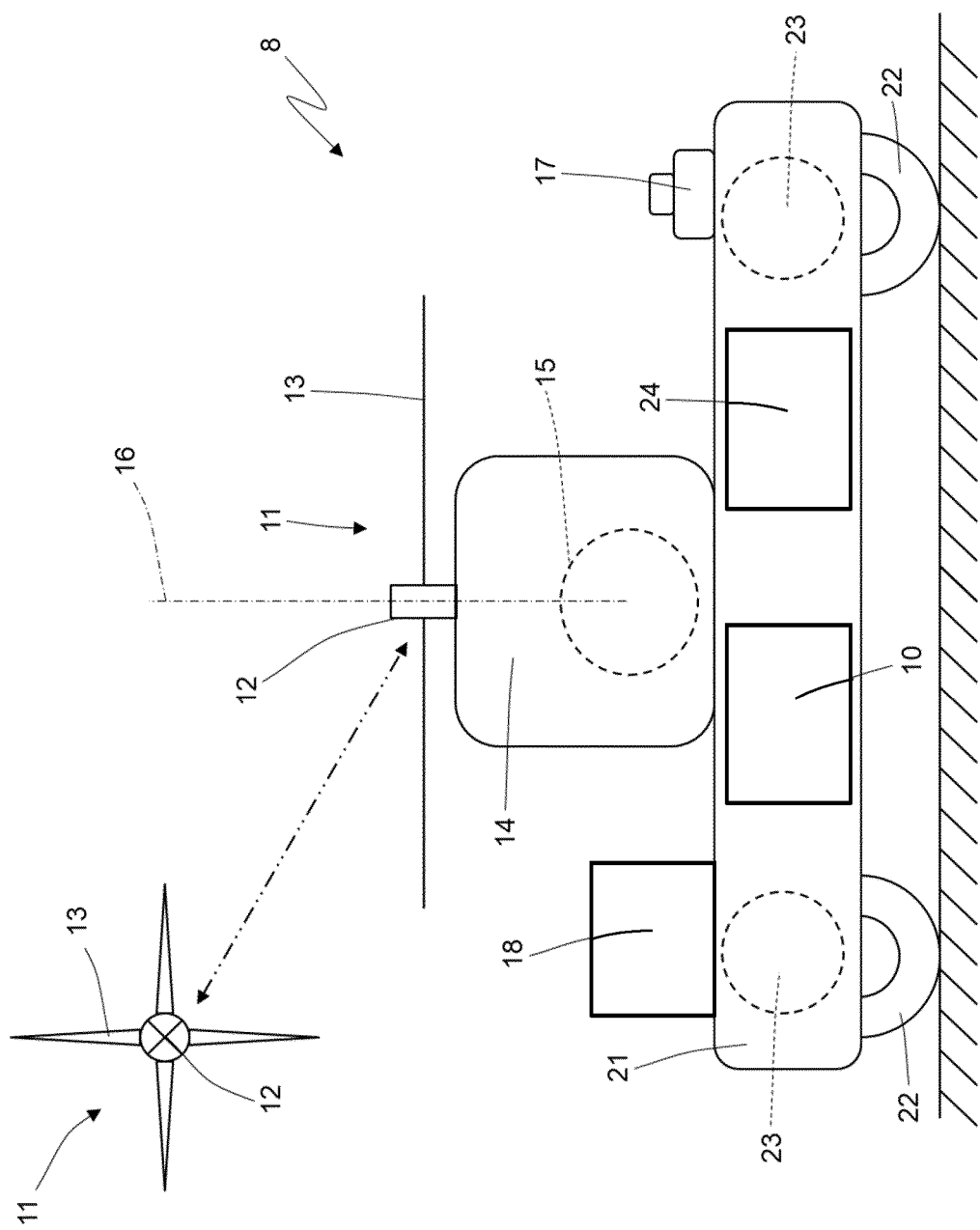
FIG. 5 is a schematic view of the autonomously guided robot of FIGS. 2 and 3.

According to a preferred embodiment illustrated in FIG. 5, the antenna 11 of the reader device 9 comprises a vertically oriented central support 12 that supports four monopoles 13 arranged in a cross and oriented horizontally. Preferably, the reader component 10 activates the four monopoles 13 in sequence, and therefore in a non-synchronized manner (i.e., one at a time) insofar as this mode allows for faster reading of the transponders 7 that are incorporated into the pneumatic tires 2; in other words, the reader component 10 cyclically activates, and at a relatively high frequency, just one monopole 13 at a time, in such a way as to have, at each instant, one monopole 13 active and the other three monopoles 13 turned off.

According to a preferred embodiment illustrated in the attached figures, the autonomously guided robot 8 comprises a movement unit 14 that carries, on the top thereof, the antenna 11 of the reader device 9 and it is telescopic, i.e., the vertical extent thereof can be varied (as is evident in comparing FIGS. 2 and 3). In other words, the telescopic displacement unit 14 is suitable for imparting a vertical linear movement (i.e., along a vertical Z direction) to the antenna 11 of the reader device 9, between a handling position (shown in FIG. 2), wherein the antenna 11 is at the minimum distance from the autonomously guided robot 8 (i.e., the ground) and the telescopic movement unit 14 is at the minimum extension thereof, and a reading position (illustrated in FIG. 3), wherein the antenna 11 is moved to the maximum distance from the autonomously guided robot 8 (i.e., the ground) and the telescopic movement unit 14 is at the maximum extension thereof. The antenna 11 of the reader device 9 is maintained in the handling position (illustrated in FIG. 2) when the autonomously guided robot 8 is required to move within the storage warehouse 1 (i.e., it has to move) while the antenna 11 of the reader device 9 is temporarily moved from the handling position (illustrated in FIG. 2) to the reading position (illustrated in FIG. 3) when the autonomously guided robot 8 is stopped at the bottom and at the center of a stack of pneumatic tires 2 in order to allow for the reading of the transponders 7 of all of the pneumatic tires 2.

In particular, and as illustrated in FIG. 5, the telescopic displacement unit 14 is provided with an electric actuator 15 that expands and contracts the telescopic movement unit 14 such as to vertically move the antenna 11 of the reader device 9 between the handling position (illustrated in FIG. 2) and the reading position (illustrated in FIG. 3).

According to a possible embodiment illustrated in FIG. 5, the antenna 11 of the reader device 9 is rotatably mounted upon the movement unit 14 such as to rotate around a vertical axis of rotation 16; in this case the electric actuator 15 may simultaneously impart to the antenna 11 both the vertical translational movement, and the rotational movement around the axis of rotation 16. Alternatively, the antenna 11 of the reader device 9 is not rotatably mounted upon the movement unit 14, but in use the autonomously guided robot 8 turns (pirouettes) upon itself, utilizing the means of locomotion thereof, thereby turning the antenna 11 of the reader device 9 (together with the rest of the autonomously guided robot 8) around the vertical axis of rotation 16.

According to a different embodiment (not illustrated), the linear displacement (i.e., the offset) along vertical direction Z of the antenna 11 of the reader device 9 between the handling position (illustrated in FIG. 2) and the reading position (illustrated in FIG. 3) is performed by means of a different mechanism (i.e., a mechanism other than a telescopic support component).

As previously mentioned, the reader device 9 comprises the reader component 10 and the antenna 11. According to a possible embodiment illustrated in the attached figures, only the antenna 11 of the reader device 9 is mounted upon the movement unit 14 in order to be moved by the movement unit 14 itself between the handling position (illustrated in FIG. 2) and the reading position (illustrated in FIG. 3); i.e., the reader component 10 is arranged in a fixed position upon the autonomously guided robot 8 and never moves in relation to the autonomously guided robot 8 (in this case, the reader component 10 is normally connected to the antenna 11 by means of an extendable coaxial cable, for example partially coiled).

According to an alternative embodiment (not illustrated), the entire reader device 9 is mounted on the movement unit 14 in order to be moved by the movement unit 14 itself, between the handling position (illustrated in FIG. 2) and the reading position (illustrated in FIG. 3), i.e., the movement unit 14 moves both the reader component 10 and the antenna 11 which together form an indivisible unit.

As previously mentioned, the autonomously guided robot 8 moves by itself within the storage warehouse 1, moving itself from time to time to the base of a stack of pneumatic tires 2 in order to read the transponders 7 of the pneumatic tires 2 resting on a corresponding support element 3.

As illustrated in FIG. 5, the autonomously guided robot 8 comprises sensors to determine the position of the autonomously guided robot 8 within the storage warehouse 1, as well as to determine the exact position of the pneumatic tires 2 (and in particular the central cavity 6 of the pneumatic tires 2) arranged above the autonomously guided robot 8. These sensors may include a camera 17 (i.e., an optical sensor) that is oriented vertically upward and constitutes the main guide for the movement of the autonomously guided robot 8 and possibly proximity sensors (mechanical or non-contact) that are arranged along the side edge of the autonomously guided robot 8 and that detect the presence of any obstacles. In particular, the camera 17 is oriented upward in order to frame the ceiling of the storage warehouse 1 (whereupon graphics may be applied that simplify the determination of the position of the autonomously guided robot 8), the camera 17 is oriented upward in order to also frame, from below, a stack of pneumatic tires 2 above the autonomously guided robot 8, and finally the camera 17 is also oriented upward in order to frame, from below, the support elements 3 that support the stacks of pneumatic tires 2 and that are preferably provided with recognition graphics facing downward (i.e., each support element 3 carries an alphanumeric or bar code that is oriented downward). The autonomously guided robot 8 may also comprise a sensor that detects the proximity of a forklift 4, in order to stop the movement of the autonomously guided robot 8 when a forklift 4 is too close (or to move the autonomously guided robot 8 away from the forklift 4).

It is important to emphasize that the autonomously guided robot 8 remains and moves itself, as far as possible, beneath the support elements 3 in such a way as to always remain external to the travel paths of the forklifts 4 and the travel paths of operators on foot (as will also be discussed below, the charging stations for the autonomously guided robot 8 are arranged below the support elements 3). Consequently, the autonomously guided robot 8 emerges from a support element 3, only to move beneath another support element 3, in taking the shortest path on the outside of the support elements 3; otherwise, the autonomously guided robot 8 always remains in the "safe" and "protected" position (i.e., with no risk of collisions) beneath a support element 3.

The autonomously guided robot 8 comprises a wireless communication device 18 (for example, utilizing WiFi technology, beacon BLE technology, or Zigbee technology) that makes it possible for the autonomously guided robot 8 to continuously communicate with a storage warehouse 1 control server 19 (illustrated schematically in FIG. 1). In this way, the autonomously guided robot 8 is guided by the control server 19 toward the support elements 3 that support the stacks of pneumatic tires 2 to be checked and provides the control server 19 with the results of the readings. The storage warehouse 1 control server 19 is also connected to a tablet computer 20 (or a similar portable device) that is used by a forklift 4 operator; by means of the tablet computer 20, a forklift 4 operator receives operational instructions from the control server 19 and/or directly from the autonomously guided robot 8 and communicates to the control server 19 the execution of assigned tasks such as to be able to update, in real time, the state of the storage warehouse 1, namely of those pneumatic tires 2 that have entered and exited and that are currently present within the storage warehouse 1.

In other words, the control server 19 executes management software that handles the communication between the autonomously guided robot 8, and human operators (some of whom are driving the forklifts 4).

In order to ensure that a forklift 4 operator can quickly and reliably know that all of the transponders 7 of the pneumatic tires 2 that form a stack carried by the gripping device 5 (generally a stack of pneumatic tires 2 for trucks (TBR) is composed of five to seven TBR pneumatic tires 2, one on top of another as a function of the size of the pneumatic tires 2 themselves), the operator must, from time to time, enter (type) the number of pneumatic tires 2 loaded onto the gripping device 2 using the tablet computer 20; the software installed on the tablet computer 20 verifies that the number of transponders 7 that have been read by the reader device 9 corresponds (or is equal to) the number of pneumatic tires 2 loaded onto the gripping device of the forklift 4 (provided by the operator): in the event of parity, the software produces a positive signal (for example by means of a green light) and the operation of reading the transponders 7 is concluded, while, in the case of disparity, the software produces a negative signal (for example by means of a red light and an acoustic warning) and the operation of reading the transponders 7 has to be repeated (placing the stack of pneumatic tires 2 back onto a support element 3 in order to allow the autonomously guided robot 8 to repeat the reading, possibly using a slower, and therefore more "robust", reading mode).

As illustrated in FIG. 5, the autonomously guided robot 8 comprises a main body 21 which is provided with a series of wheels 22, 23 that are motorized by means of respective electric motors. The main body 21 of the autonomously guided robot 8 supports the reader component 10 of the reader device 9, the movement unit 14 (whereupon the antenna 11 of the reader device 9 is mounted), the camera 17 and the communication device 18.

Furthermore, the autonomously guided robot 8 comprises a control unit 24 that supervises the operation of the same autonomously guided robot 8. In particular, the control unit 24 is configured such as to move the main body 21 in such a way as to arrange the antenna 11 at the center of the stack of pneumatic tires 2 at the central cavities 6 of the pneumatic tires 2 themselves, in order to drive (during the reading of the transponders 7) the movement unit 14 in order to move the antenna 11 in relation to the main body 21 and along the vertical direction Z in such a way as to insert the antenna 11 into the central cavity 6 of the pneumatic tires 2, and finally in order to drive (once the reading of the transponders 7 has concluded) the movement unit 14 in order to move the antenna 11 in relation to the main body 21 and along the vertical direction Z in such a way as to extract the antenna 11 from the central cavity 6 of the pneumatic tires 2.

In other words, on the ground (i.e., on the floor of the storage warehouse 1) the vertical stacks of pneumatic tires 2 are arranged upon respective support elements 3, wherein each thereof supports at least one stack of pneumatic tires 2 at a distance from the floor of the storage warehouse 1 that is greater than a vertical dimension of the autonomously guided robot 8 in such a way that the base of each stack is at a distance from the floor of the storage warehouse 1 that is greater than the vertical dimension of the autonomously guided robot 8; the autonomously guided robot 8 (when the antenna 11 of the reader device 9 is retracted into the main body 21) can therefore pass unhindered beneath the stacks of pneumatic tires 2 arranged on the support elements 3. In use, the autonomously guided robot 8 is independently moved over the ground (i.e., over the floor of the storage warehouse 1) in order to be positioned beneath a support element 3 and beneath a first stack of pneumatic tires 2 such as to position the antenna 11 at the center of the pneumatic tires of the first stack at the central cavities 6 of the pneumatic tires 2 themselves; at this point, the antenna 11 is raised vertically in relation to the main body 21 and along the vertical direction Z such that the antenna 11 rises within the central cavities 6 of the pneumatic tires 2 of the first stack; in the meantime (i.e., when the antenna 11 is rising within the central cavities 6 of the pneumatic tires 2 of the first stack), the reader device 9 reads the transponders 7 of the pneumatic tires 2 forming the first stack. Once the reading of the transponders 7 of the pneumatic tires 2 forming the first stack has been concluded, the antenna 11 is lowered vertically in relation to the main body 21 and along the vertical direction Z such as to extract the antenna 11 from the central cavities 6 of those pneumatic tires 2 forming the first stack (i.e., in order to release the antenna 11 from the central cavities 6 of the pneumatic tires 2 forming the first stack). At this point the reading of the transponders 7 of the pneumatic tires 2 forming the first stack is complete, and therefore the autonomously guided robot 8 can be moved to beneath a second stack of pneumatic tires 2 that is different from the first stack of pneumatic tires 2 such as to position the antenna 11 at the center of the pneumatic tires 2 of the second stack at the central cavities 6 of the pneumatic tires 2 themselves and to then execute the reading of the transponders 7 of those pneumatic tires 2 forming the second stack in the same way as previously performed for the transponders 7 of the pneumatic tires 2 forming the first stack.

According to a possible embodiment, the reading of the transponders 7 of those pneumatic tires 2 forming a stack is performed twice (in a redundant way, in order to perform a double check): a first reading of the transponders 7 is performed while the antenna 11 rises vertically within the central cavities 6 of those pneumatic tires 2 forming the stack (i.e., during the forward movement of the antenna 11) while a second reading of the transponders 7 is performed while the antenna 11 descends vertically within the central cavities 6 of those pneumatic tires 2 forming the stack (i.e., during the return movement of the antenna 11).

According to a further embodiment, the reading of the transponders 7 of those pneumatic tires 2 forming a stack is performed only once while the antenna 11 descends vertically within the central cavities 6 of those pneumatic tires 2 forming the stack (i.e., during the return movement of the antenna 11) rather than while the antenna 11 ascends vertically within the central cavities 6 of those pneumatic tires 2 forming the stack (i.e., during the forward movement of the antenna 11).

The storage warehouse 1 comprises one or more charging stations for the autonomously guided robot 8 that are preferably arranged beneath the support elements 3, or else in positions that are only accessible to the autonomously guided robot 8 (which can move beneath the support elements 3) and therefore externally to the movements of the forklifts 4 and operators on foot.

Figure 6:
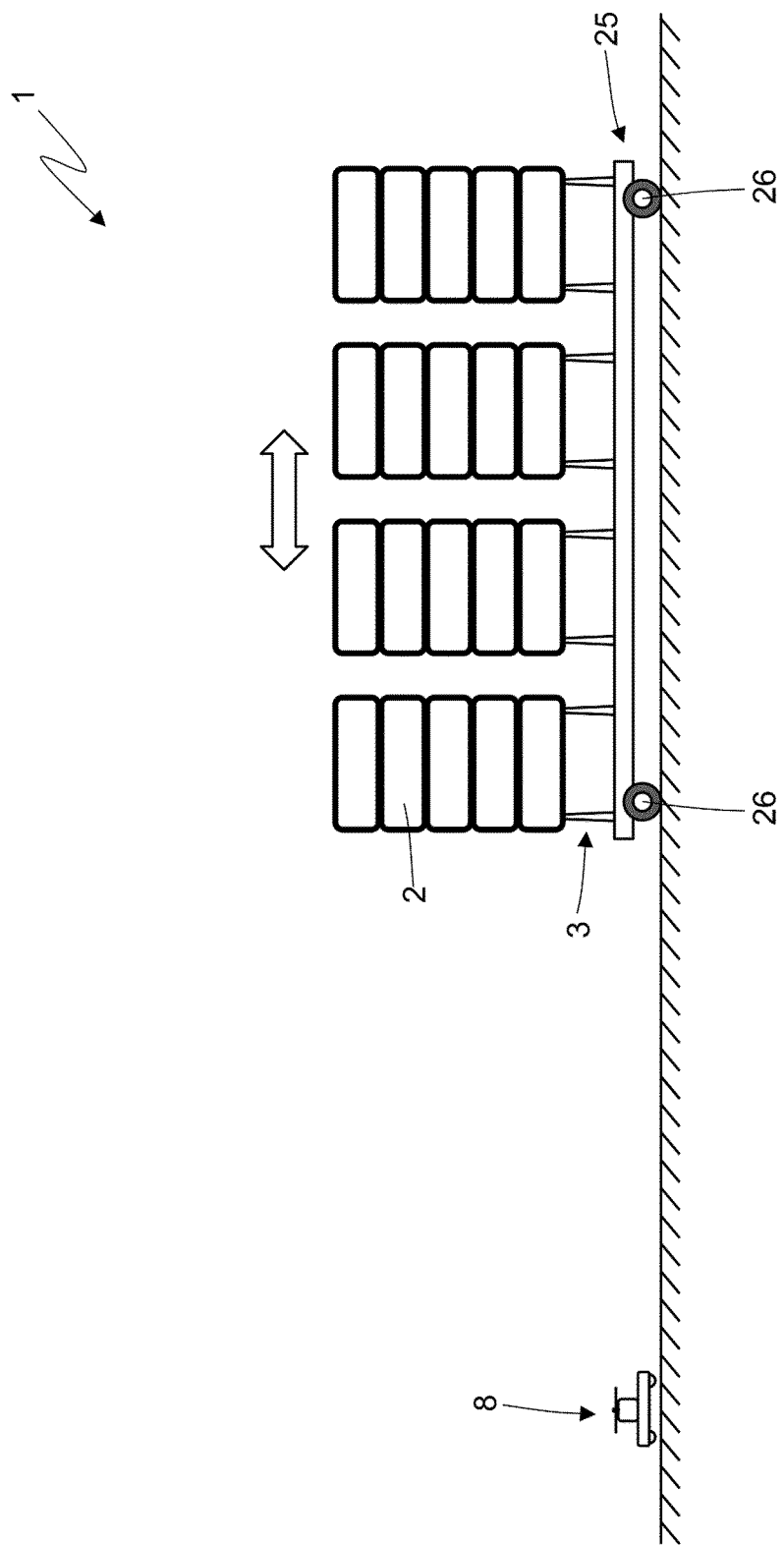
FIG. 6 is a schematic view of a variant of the storage warehouse of FIG. 1.

In the alternative embodiment illustrated in FIG. 6, instead of using forklifts 4 that pick up a stack of pneumatic tires 2 from a support element 3 and load the stack of pneumatic tires 2 into a container or into a truck, groups of support elements 3 (that house respective stacks of pneumatic tires 2) are mounted onto a carriage 25 equipped with wheels 26; in this case, a carriage 25 which carries a group of support elements 3 (that house respective stacks of pneumatic tires 2) is pushed into a container or a truck.

Figure 7:
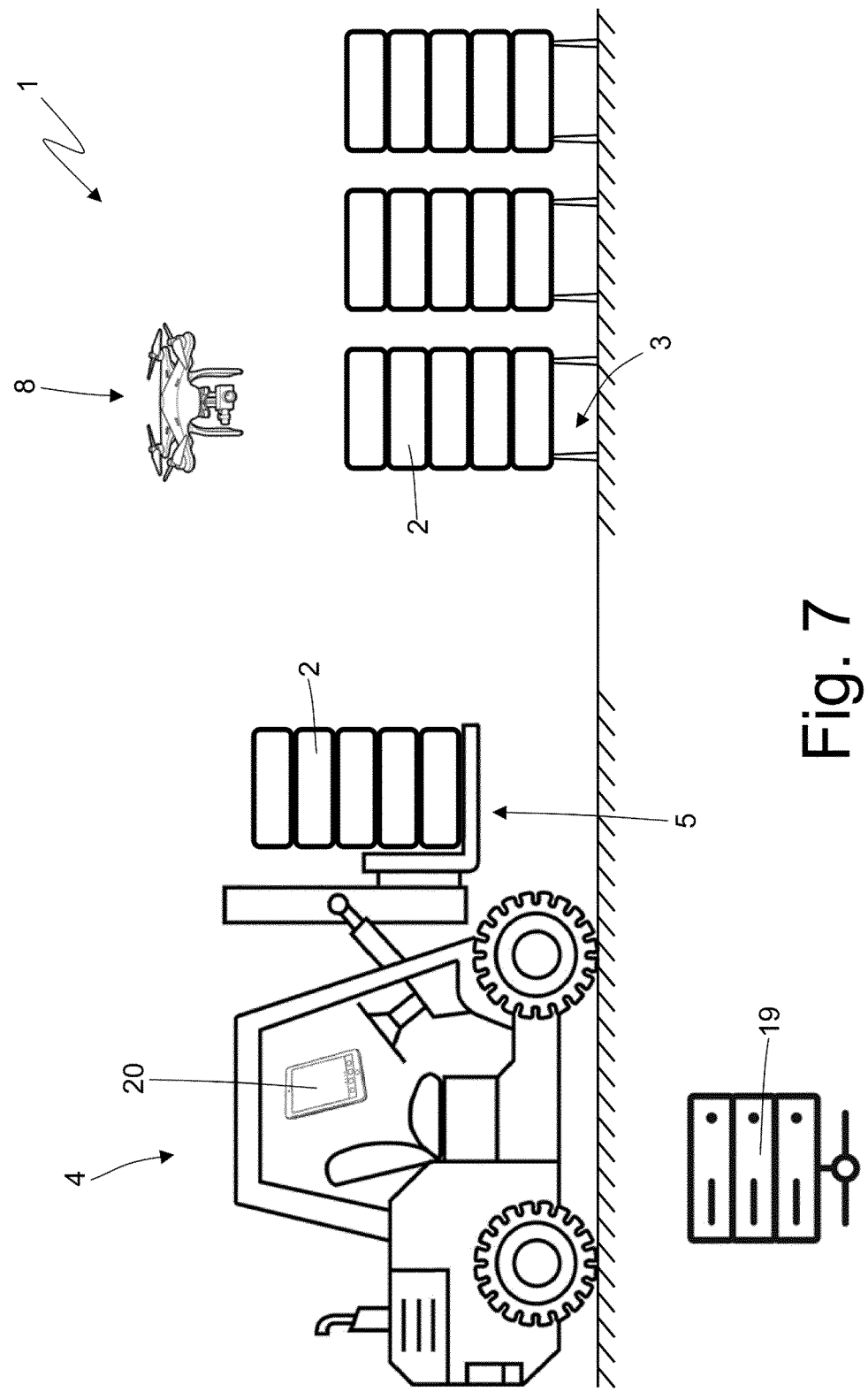
FIG. 7 is a schematic view of a transponder of a further variant of the storage warehouse of FIG. 1.

In the embodiment illustrated in FIGS. 1-6, the autonomously guided robot 8 is "terrestrial", i.e., it moves over the floor of the storage warehouse 1 by means of the wheels 22; in the alternative embodiment shown in FIG. 7, the autonomously guided robot 8 is "airborne", i.e., it flies within the storage warehouse 1 by means of propellers (in other words, the autonomously guided robot 8 is an unmanned aerial vehicle commonly known as a drone).

It is also possible that within a single storage warehouse 1, both "terrestrial" autonomously guided robots 8 and "airborne" autonomously guided robots 8 are simultaneously present.

The embodiments described herein can be combined with each other without departing from the scope of protection of the present invention.

The management method described above, utilizing the autonomously guided robot 8, has many advantages.

In the first place, the management method described above makes it possible to effectively, safely (i.e., minimizing the possibility of errors), and efficiently read the transponders 7 of all of the pneumatic tires 2 of a stack carried by a support element 3 in a way that is completely independent of the operations performed by an operator of a forklift 4. That is to say that the reading of the transponders 7 of a stack of pneumatic tires 2 is performed without the operator of a forklift 4 having to perform any type of operation and therefore without any increase in time for the same operator.

Furthermore, the autonomously guided robot 8 is simple and inexpensive to manufacture insofar as it requires the use of components that are commercial, have a relatively low cost and that are readily available on the market.

LIST OF REFERENCE NUMBERS IN THE FIGURES 1 storage warehouse
2 pneumatic tires
3 support element
4 forklift
5 gripping device
6 central cavity
7 transponder
8 autonomously guided robot
9 reader device
10 reader component
11 antenna
12 central support
13 monopoles
14 movement unit
15 electric actuator
16 axis of rotation
17 camera
18 communication device
19 control server
20 tablet computer
21 main body
22 wheels
23 electric motors
24 control unit
25 carriage
26 wheels
Z vertical direction

The invention claimed is:

1. A method for the management of a warehouse that houses pneumatic tires fitted with respective transponders, the method comprising:
   stacking the pneumatic tires one on top of another to form vertical stacks;
   moving over a floor of the warehouse an autonomously guided robot configured to move independently and support a reader device, the reader device provided with a reader component and an antenna and configured to read the transponders, wherein the antenna of the reader device comprises a vertically oriented central support that supports four monopoles arranged in a cross and oriented horizontally;
   arranging the vertical stacks of pneumatic tires on respective support elements, wherein each support element supports at least one stack of pneumatic tires at a distance from a floor of the warehouse that is greater than a vertical dimension of the autonomously guided robot, wherein a base of each stack is at a distance from the floor of the warehouse that is greater than the vertical dimension of the autonomously guided robot;
   moving the autonomously guided robot beneath a support element and beneath a first stack of pneumatic tires to position the antenna at a center of the pneumatic tires of the first stack;
   vertically raising the antenna in relation to a main body of the autonomously guided robot along a vertical direction, wherein the antenna rises within respective central cavities of the pneumatic tires of the first stack;
   vertically lowering the antenna in relation to a main body of the autonomously guided robot along a vertical direction, wherein the antenna is extracted from the central cavities of the pneumatic tires forming the first stack; and
   reading, via the reader device, the transponders of the pneumatic tires forming the first stack while the antenna is inside the central cavities of the pneumatic tires forming the first stack,
   wherein during the vertically raising and/or the vertically lowering of the antenna the reader component activates the four monopoles in sequence so that at each instant a single monopole is active.

2. The method of claim 1, further comprising, once the reading of the transponders of the pneumatic tires forming the first stack has been completed:
   moving the autonomously guided robot to beneath a second stack of pneumatic tires that is different from the first stack of pneumatic tires to position the antenna at a center of the pneumatic tires of the second stack at respective central cavities of the pneumatic tires themselves; and
   repeating the steps for transponder reading of the pneumatic tires forming the first stack with respect to the transponders of the pneumatic tires forming the second stack.

3. The method of claim 1, further comprising, during the reading of the transponders, rotating the autonomously guided robot upon itself to determine a corresponding rotation of the antenna around an axis of vertical rotation.

4. The method of claim 1, further comprising using a sensor to determine a position of the autonomously guided robot within the storage warehouse, relative to a position of the central cavities of the pneumatic tires of the first stack.

5. The method of claim 4, wherein the sensor is a vertically upwardly oriented camera.

6. The method of claim 1, comprising moving at least one support element that is mounted in a carriage equipped with wheels to move the corresponding pneumatic tires.

7. The method of claim 6, wherein the carriage is pushed into a container or a truck to load the corresponding pneumatic tires into the container or truck.

8. An autonomously guided robot for automatic recognition of pneumatic tires fitted with transponders and arranged in a plurality of vertical stacks, wherein the vertical stacks are arranged on respective support elements, wherein each support element supports at least one stack of pneumatic tires at a distance from a floor of a warehouse that is greater than a vertical dimension of the autonomously guided robot, and wherein a base of each stack is at a distance from the floor of the warehouse that is greater than the vertical dimension of the autonomously guided robot, the autonomously guided robot comprising:
- a main body configured to move autonomously across a floor within the warehouse;
- a reader device comprising a reader component and an antenna configured to read the respective transponders associated with the pneumatic tires, wherein the antenna of the reader device comprises a vertically oriented central support that supports four monopoles arranged in a cross and oriented horizontally;
- a movement unit mounted on the main body and supporting the antenna for moving the antenna in relation to the main body in a vertical direction; and
- a control unit configured to
  - move the autonomously guided robot beneath a support element and beneath a first stack of pneumatic tires to position the antenna at a center of the pneumatic tires of the first stack;
  - vertically raise the antenna in relation to a main body of the autonomously guided robot along a vertical direction, wherein the antenna rises within respective central cavities of the pneumatic tires of the first stack;
  - vertically lower the antenna in relation to a main body of the autonomously guided robot along a vertical direction, wherein the antenna is extracted from the central cavities of the pneumatic tires forming the first stack; and
  - read, via the reader device, the transponders of the pneumatic tires forming the first stack while the antenna is inside the central cavities of the pneumatic tires forming the first stack,
- wherein the reader component is configured during the vertically raising and/or the vertically lowering of the antenna to activate the four monopoles in sequence wherein at each instant a single monopole is active.

9. The autonomously guided robot of claim 8, wherein the control unit is configured to:
- move the main body to arrange the antenna at the center of the pneumatic tires of the first stack at the central cavities of the pneumatic tires themselves;
- during the reading of the transponders, drive the movement unit to move the antenna in relation to the main body and along the vertical direction to insert the antenna into the central cavities of the pneumatic tires; and
- once the reading of the transponders has been completed, drive the movement unit to move the antenna in relation to the main body along the vertical direction to extract the antenna from the central cavities of the pneumatic tires.

10. The autonomously guided robot of claim 8, wherein, during the reading of the transponders, the control unit is configured to rotate the autonomously guided robot upon itself and determine a corresponding rotation of the antenna around an axis of vertical rotation.

11. The autonomously guided robot of claim 8, wherein the movement unit of the antenna is telescopic.

12. The autonomously guided robot of claim 8, comprising at least one sensor configured to determine a position of the autonomously guided robot within the storage warehouse, relative to a position of the central cavities of the pneumatic tires of the stack.

13. The autonomously guided robot of claim 12, wherein the at least one sensor comprises a vertically upwardly oriented camera.

14. The autonomously guided robot of claim 8, wherein the control unit is configured, once the reading of the transponders of the pneumatic tires forming the first stack has been completed, to:
- move the autonomously guided robot to beneath a second stack of pneumatic tires that is different from the first stack of pneumatic tires to position the antenna at a center of the pneumatic tires of the second stack at respective central cavities of the pneumatic tires; and
- repeat the transponder reading operations of the pneumatic tires forming the first stack with respect to the transponders of the pneumatic tires forming the second stack.

15. The autonomously guided robot of claim 8, wherein at least one support element is mounted in a carriage equipped with wheels, and the control unit is configured to move the at least one support element mounted in the carriage to move the corresponding pneumatic tires.

16. The method of claim 15, wherein the carriage is pushed into a container or a truck to load the corresponding pneumatic tires into the container or truck.

* * * * *